United States Patent [19]

Barchman

[11] Patent Number: 4,917,230
[45] Date of Patent: Apr. 17, 1990

[54] APPARATUS FOR HANDLING BAKING PRODUCTS

[76] Inventor: Joseph Barchman, 2603 Oak St., Point Pleasant, N.J. 08742

[21] Appl. No.: 261,398

[22] Filed: Oct. 24, 1988

[51] Int. Cl.⁴ .............................................. B65G 47/26
[52] U.S. Cl. .................................... 198/434; 198/448; 198/457
[58] Field of Search ............... 198/434, 432, 433, 448, 198/457

[56] References Cited

U.S. PATENT DOCUMENTS

| | | | |
|---|---|---|---|
| 1,109,284 | 9/1914 | Friel | 198/457 |
| 2,546,951 | 3/1951 | Petrilli | 198/576 X |
| 3,108,677 | 10/1963 | Temple | 198/575 X |
| 3,202,260 | 8/1965 | Wolf | 198/560 |
| 3,324,987 | 6/1967 | Hans-Jürgenkiesser | 198/434 |
| 3,526,472 | 9/1970 | Remensperger et al. | 99/353 |
| 4,619,358 | 10/1986 | May et al. | 198/457 |

FOREIGN PATENT DOCUMENTS

| | | | |
|---|---|---|---|
| 230302 | 12/1963 | Austria | 198/457 |
| 111623 | 8/1964 | Czechoslovakia | 198/434 |
| 217426 | 9/1986 | Japan | 198/448 |
| 562129 | 5/1975 | Switzerland | 198/457 |

Primary Examiner—Frank E. Werner
Assistant Examiner—Cheryl L. Gastineau
Attorney, Agent, or Firm—Clifford G. Frayne

[57] ABSTRACT

An automated baking station for the transportation and sequencing of dough pieces from a forming station to an oven which comprises a series of conveyor belts and a sequencing hopper in order to automatically sequence and stagger multiple dough pieces produced in parallel at the forming station for alternate staggered dough pieces for feeding into the oven.

4 Claims, 3 Drawing Sheets

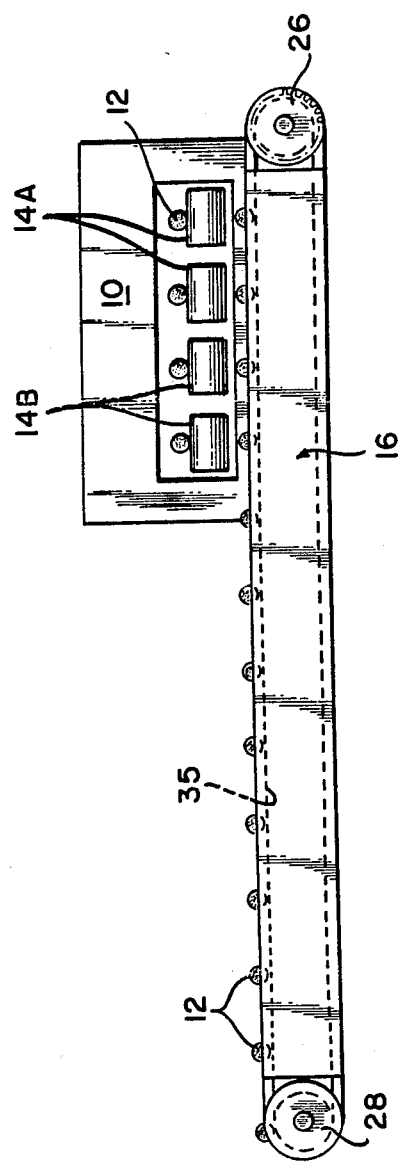
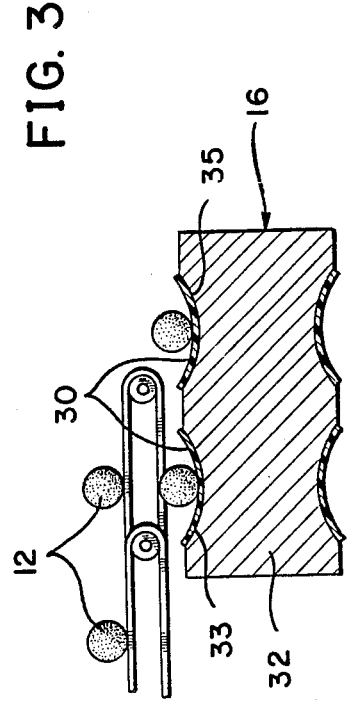

APPARATUS FOR HANDLING BAKING PRODUCTS

FIELD OF INVENTION

The present invention relates to an apparatus for handling baking products and more particularly, a conveyor system for automatically, selectively aligning the baking products for introduction into a baking oven.

BACKGROUND OF THE INVENTION

The goal of mass production is to automate as much as possible. This is particularly true in the bakery art where dough is mixed, shaped and then introduced into an oven, removed from the oven and packaged. A great degree of manual effort was required in the bakery art with the operator manually moving baking trays from operation to operation. Gradually, automation was introduced into the bakery art and there are a number of patents known to the inventor that deal with conveyor systems having application to the bakery art. See U.S. Pat. Nos. 2,546,951; 3,202,260; 3,108,677; and 3,526,472.

The aforementioned patents have application to the bakery art in the transfer of dough and bakery products on baking trays from operation to operation.

Applicant's invention is concerned with the transfer of dough, from the shaping machine, to the oven whereby certain steps occur in the intervening transportation of the dough such steps including but not limited to the further shaping or flattening of the dough ball.

In order to obtain uniformity in size, shape, thickness, and cooking time, the dough balls, after having been formed, must be positioned on the conveyor belt, in a selective pattern in order to be introduced into the shaping machine and subsequent oven. With respect to the mass production of baking products of a Mexican origin, these steps were normally handled manually. Applicant's invention provides for an automated conveyor process which permits the operator to selectively control the pattern by which the dough balls are introduced into the roller mechanism for shaping and subsequently into the oven for cooking. Applicant's invention was designed for the mass production of Mexican baked goods such as tortillas and the like and will be described with respect to same; however, Applicant's invention is capable of handling and selectively arranging dough balls in the weight range from one ounce to five and a half ounces.

OBJECT OF THE INVENTION

An object of the invention is to provide a novel apparatus for the transfer and selective arrangement of baked goods from the dough machine to intervening rolling and shaping machines to the oven.

Another object of the invention is to provide a novel apparatus for the transfer and selective arrangement of baked goods which permits the operator the ease of operation in changing the selective arrangement of the baked goods.

A still further object of the present invention is to provide a novel apparatus for the transfer and selective arrangement of baked goods eliminates manual handling of the baked goods.

SUMMARY OF THE INVENTION

The instant invention comprises a pair of unequal length transfer belts substantially perpendicularly positioned with respect to a pair of second transfer belts, the second transfer belts being concave in cross sectional shape, the second pair of conveyor belts terminating at an arrangement hopper, the arrangement hopper staggering the positioning of the dough balls for entry into the rolling and shaping machines such that only one dough ball at a time is subject to rolling and shaping.

BRIEF DESCRIPTION OF THE DRAWINGS

These and other objects of the present invention will be manifest in considering the accompanying drawings wherein.

FIG. 2 is a side elevational view of the conveyor means in accordance with the invention hereof;

FIG. 3 is a longitudinal view of the conveyor means in accordance with the invention hereof;

DETAILED DESCRIPTION OF THE DRAWINGS

Figure 1:
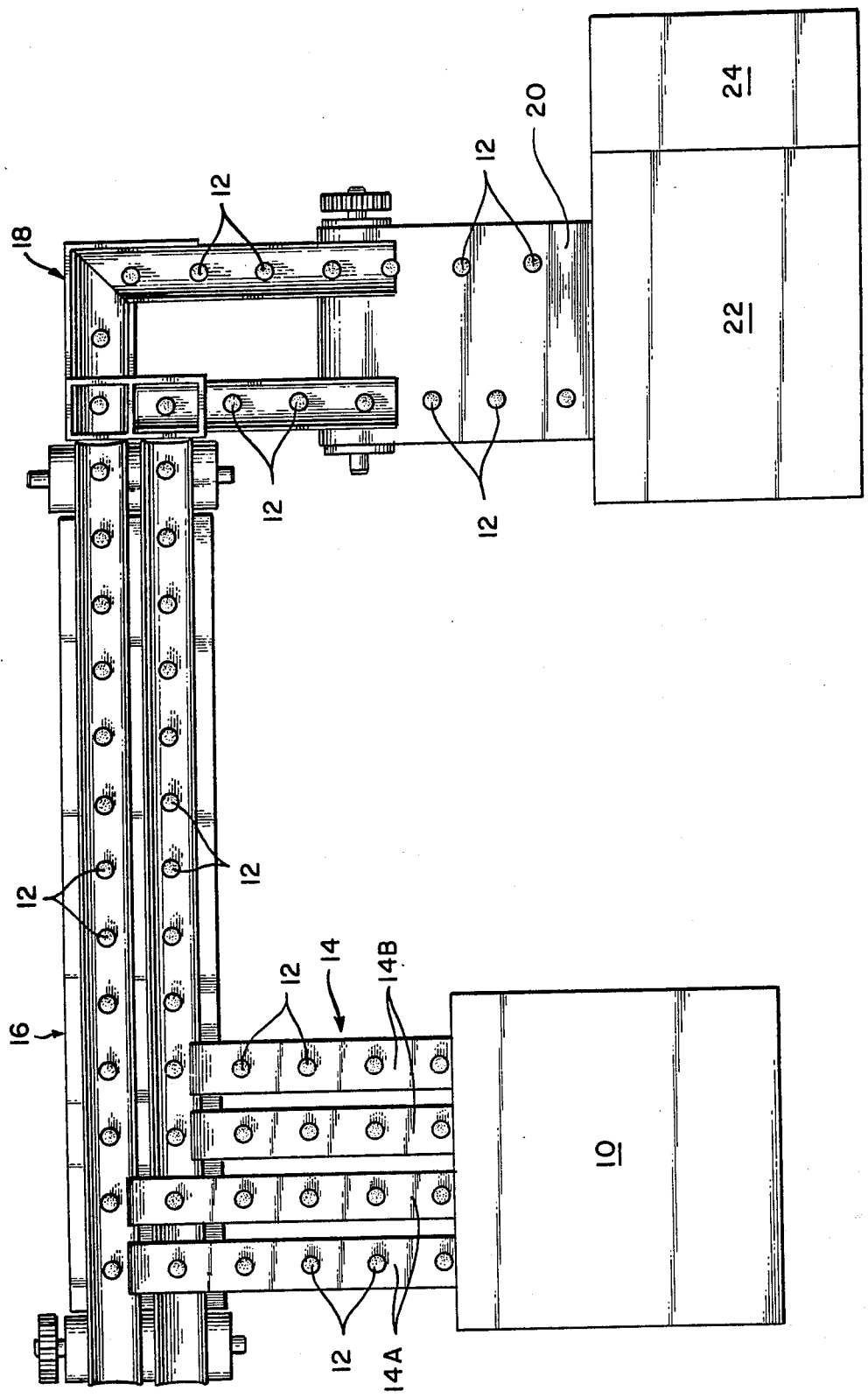
FIG. 1 is a schematic planer view of the installation for carrying out the method in accordance with the invention hereof.

Referring to FIG. 1, there is shown a schematic planer view of a baking installation with automatic forming, transportation, sequencing and heating of baked products.

Dough is fed into a forming unit 10 in which the dough is formed into dough balls 12, as shown exiting forming unit 10. The dough balls 12 are formed in unit 10 to the desired weight. In the example shown in embodiment 1 in FIG. 1, the dough balls exit forming unit 1 by means of parallel finger belts 14. Finger belts 14 are conveyor belts which transport dough balls 12 to a second transportation means described hereafter. In order to aid in the sequencing of the dough balls, finger belts 14 are designed in pairs 14A and 14B, each pair being of unequal length.

The second transportation means comprises a conveyor belt 16, which in embodiment 1 is perpendicular to finger belts 14. In this configuration, with the unequal lengths of finger belts 14A and 14B, dough balls 12 are deposited on conveyor belt 16 in alignment, such that the dough balls 12 are paired in parallel alignment to each other.

Conveyor belt 16 transports each pair of dough balls to a sequencing hopper 18 which has unequal length sequencing chutes as will be described hereafter. Sequencing hopper 18 redirects the dough balls as shown in embodiment 1 in FIG. 1, at an angle of ninety degrees and deposits the dough balls in a staggered formation on a third conveyor means 20. Third conveyor means 20 transports the dough balls 12 to a sheeter unit 22 where the dough balls are automatically rolled, flattened, shaped, or the like into the desired configuration for baking. The sheeter unit 22 by means of internal conveyor system, automatically feeds the configured dough balls 12 into oven 24 for baking. The dough balls are removed from oven 24 in any one of many conventional means.

The objects of Applicant's invention are achieved by means of the unequal length finger belts 14A and 14B, together with second conveyor belt 16 and sequencing hopper 18, in order to produce a maximum quantity of dough balls from forming unit 10, transport these dough balls to the oven 24 and in doing so, arrange and sequence the dough balls 12 to undergo the intermediate step of rolling, flattening, shaping and configuring the dough balls 12 without the need of manual labor in order to feed the dough balls into the sheeting unit 22.

Referring to FIG. 2 and 3, there is shown a side elevational view of second conveyor means 16 and a longitudinal view. Second conveyor means 16 comprises a drive roller 26 and an idler roller 28 positioned at opposite ends of conveyor means 16 for the movement of belt 30 on conveyor means 16. Base 32 of second conveyor means 16 comprises two concave or C-shaped longitudinal pathways 33 and 35 respective to which belt 30 is configured. This configuration provides second conveyor belt 16 with two concave pathways for the receipt of dough balls from forming unit 10 and finger belts 14A and 14B. The concave configuration prevents dough balls 12 from falling off of second conveyor belt 16 and further serves to aid in the alignment of dough balls 12 by causing dough balls 12 to position themselves on second conveyor means 16 at the lowest portion of the concave pathways.

Referring to FIG. 1 and FIG. 2, it can be seen that two dough balls 12 will exit forming unit 10 and be deposited by unequal finger belts 14A, in the C-shaped passageway closest to forming unit 10. Similarly, two dough balls 12 will exit forming unit 10 by means of unequal finger belts 14B and be deposited on the C-shaped passageway furthest from forming unit 10. At steady state operation, dough balls 12 deposited by finger belts 14B will move forward and come into alignment with dough balls 12 deposited by unequal finger belts 14A such that there will be two dough balls 12 in parallel alignment on second conveyor belt 16, followed by a sequencing space and two more dough balls 12.

Figure 4:
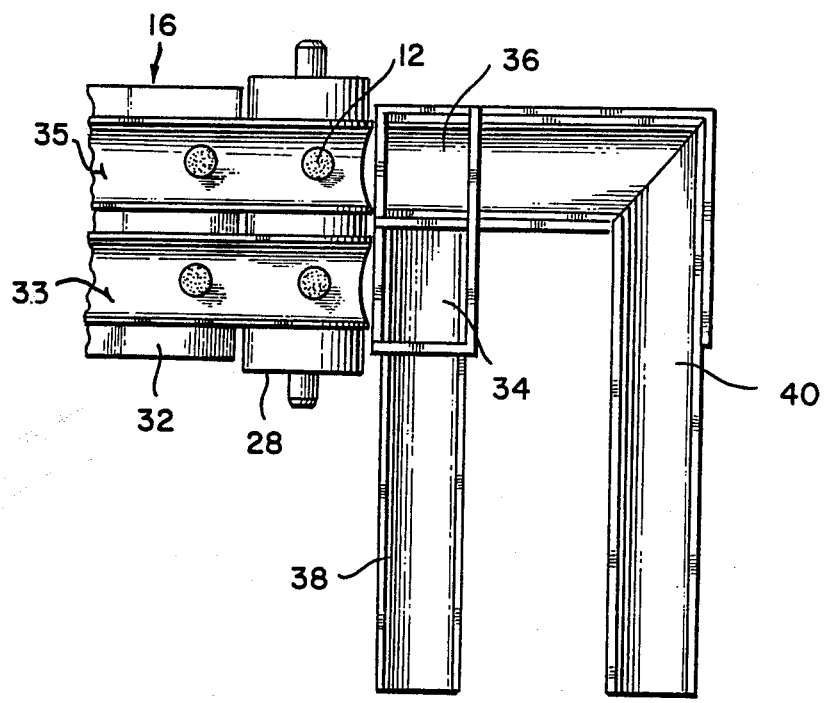
FIG. 4 is a top planer view of the arrangement hopper.
Figure 5:
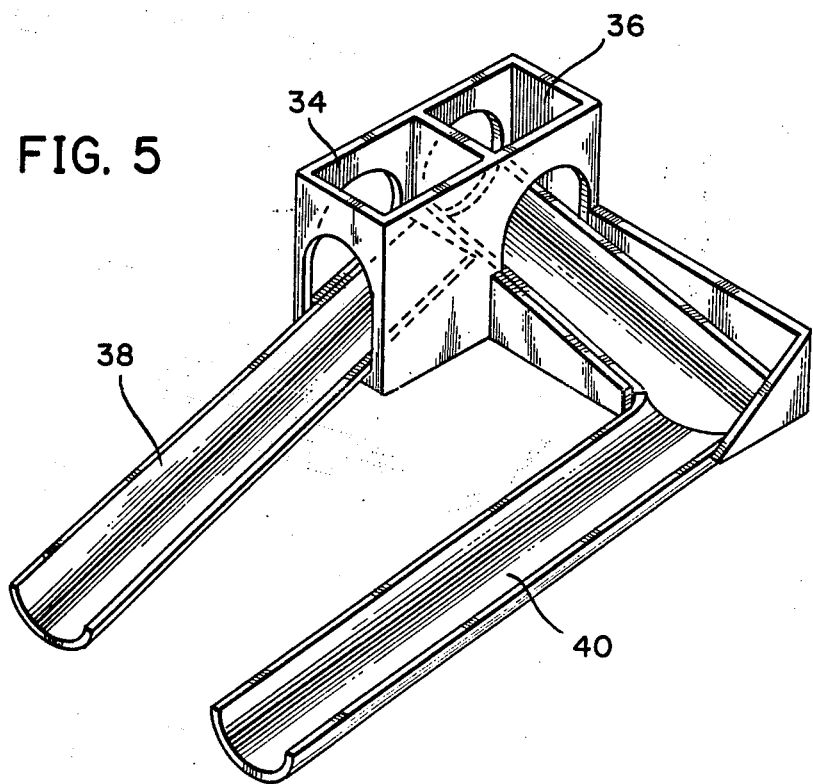
FIG. 5 is a perspective view of the arrangement hopper.

Referring to FIG. 4, there is shown a top planer view of sequencing hopper 18 which is positioned at one end of second conveyor belt 16. Sequencing hopper 18 comprises two openings 34 and 36 which are in alignment with C-shaped passageways on second conveyor belt 16 and positioned to permit dough balls 12 on each of the C-shaped passageways on second conveyor belt 16 to enter respective openings 34 and 36 in sequencing hopper 18. The dough balls 12 which are paired in alignment on second conveyor belt 16 enter respective openings 34 and 36 in sequencing hopper 18. Dough ball 12 entering opening 34 immediately changes direction ninety degrees and proceeds under the force of gravity down chute 38 which again is C-shaped in cross sectional area. Dough ball 12 which enters opening 36, proceeds in the same direction for a short distance before making a ninety degree turn and proceeding under the force of gravity down chute 40 which again, is C-shaped in cross sectional area. The routing of the dough balls 12 by sequencing hopper 18 and the unequal distance the dough balls 12 follow in sequencing hopper 18 permits a single sequencing of dough balls as they are fed from the ends of chutes 38 and 40 onto third conveyor means 20.

FIG. 4 is a perspective view of the sequencing hopper 18 which more clearly shows the unequal paths taken by the dough balls in sequencing hopper 18 before reaching third conveyor means 20.

Third conveyor means 20 is again a conventional conveyor means having a drive roller and an idler roller and is positioned at one end to receive dough balls from sequencing hopper 18. The dough balls 12 must be sequenced on third conveyor means 20 before entering sheeter unit 22 such that the rolling, flattening and shaping operation of sheeter unit 22 is accomplished on one dough ball at a time.

In the past, dough balls formed in forming unit 10 would have been manually collected and individually fed into the sheeter unit 22 for shaping prior to entry into oven 24. Applicant's invention permits forming unit 10 to manufacture large quantities of dough balls and to sequentially feed them automatically to the sheeter unit 22. Applicant's invention permits the accumulation of dough balls 12 on second conveyor means 16 and the subsequent arrangement and sequencing of dough balls 12 by sequencing hopper 18 so that the accomplishment of feeding one dough ball at a time into the sheeter unit is accomplished. Further, Applicant's invention, as shown in FIG. 1, utilizes two ninety-degree turns to transport the dough balls from forming unit 10 to sheeter unit 22 in order to accommodate space requirements. It should also be noted that while the embodiment shown in FIG. 1 anticipates the production and transportation of four dough balls at a time from forming unit 10, forming unit 10 could be expanded and additional finger belts added, an additional C-shaped passageways on second conveyor means 16 and additional openings and chutes in sequencing hopper 18 could be designed to provide for a larger quantity of dough balls 12 being formed in forming unit 10.

Applicant's invention has been shown in a preferred embodiment for tortillas and other Mexican foods. The utilization of Applicant's unequal length finger belt conveyors in conjunction with the transport conveyors and arrangement hopper could be modified without departing from the spirit of the invention to provide for a different configuration for the transportation of the dough. Additionally, elevation changes can be accomplished through the insertion of auxiliary conveyor systems to change the pathway from one elevation to another or in the tilting of existing conveyors as shown.

All the conveyors are motor-driven and their respective speeds are adjustable and are indexed to the speed of the finger belts transporting the dough balls from the forming unit.

While the above matter describes and illustrates the preferred embodiment of the invention, it should be understood that the invention is not restricted solely to the described embodiments, but that it covers all modifications which should be apparent to one skilled in the art which would fall within the scope and spirit of the invention.

I claim:

1. An automated baking station for the transportation and sequencing of dough pieces from the forming station to the oven comprising:
    a first conveyor belt means for transporting said dough pieces from said forming station comprising a plurality of unequal length conveyor belts matched in pairs of equal length;
    a second conveyor belt means in communication with said first conveyor belt means and angularly aligned therewith for receipt of said dough pieces in horizontal alignment, said second conveyor belt means comprising a plurality of parallel conveyor belts, each conveyor belt in communication with a respective pair of said equal length conveyor belts of said first converter belt means;
    a sequencing hopper in communication with said second conveyor means, said sequencing hopper comprising a plurality of unequal length sequencing chutes in alignment with said second conveyor means, each of said unequal length sequencing chutes in alignment with a respective one of said plurality of parallel conveyor belts and said dough pieces, said unequal length sequencing chutes depositing said dough pieces in sequentially staggered formation on a third conveyor belt means for transportation to a rolling station and said oven.

2. An automated baking station in accordance with claim 1 wherein said second conveyor belt means is arcuately concave perpendicular cross sectional area to the longitudinal direction of travel.

3. An automated baking station in accordance with claim 1 wherein said unequal length sequencing chutes of said sequencing hopper are positioned perpendicular to said second conveyor belt means.

4. An automated baking station in accordance with claim 1 wherein said unequal length sequencing chutes of said sequencing hopper are arcuately concave to the direction of travel of said dough pieces.

* * * * *